A. R. STEPHEN.
ALMOND HULLER.
APPLICATION FILED NOV. 22, 1919.

1,359,766.

Patented Nov. 23, 1920.

INVENTOR.
Archibald R. Stephen
BY
ATTORNEY

UNITED STATES PATENT OFFICE.

ARCHIBALD R. STEPHEN, OF LODI, CALIFORNIA.

ALMOND-HULLER.

1,359,766.  Specification of Letters Patent.  Patented Nov. 23, 1920.

Application filed November 22, 1919. Serial No. 340,027.

*To all whom it may concern:*

Be it known that I, ARCHIBALD R. STEPHEN, a citizen of the United States, residing at Lodi, county of San Joaquin, State of California, have invented certain new and useful Improvements in Almond-Hullers; and I do declare the following to be a full, clear, and exact description of the same, reference being had to the accompanying drawings, and to the characters of reference marked thereon, which form a part of this application.

This invention relates to improvements in almond hulling machines, the principal object being to so construct and arrange certain parts of the machine that abrading and breaking of the almonds is practically eliminated, thus insuring that the nuts hulled will be in first class condition, and enhancing their market value.

As practically none of the nuts will be cracked while being hulled, there will be no loose or broken kernels among the hulled almonds, thus eliminating what is at present a very serious loss.

This absence of scattered broken or loose kernels makes the use of a large force of handlers or inspectors unnecessary, since the loose kernels when present require a great deal of hand sorting to segregate them from the whole nuts. By means of my improved huller I am able to hull at one operation a higher percentage of nuts than is obtainable with other machines. This of course effects a great saving in the cost of hulling, since the nuts remaining unhulled must be again put through the machine.

I am also enabled to hull a greater quantity of almonds in a given time and with less power, than is otherwise possible, as will be shown hereinafter.

My huller is also adapted to run at the same speed regardless of the size and variety of the almonds being handled, thus doing away with the necessity for extra or reserve power when hulling different sized nuts.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1:
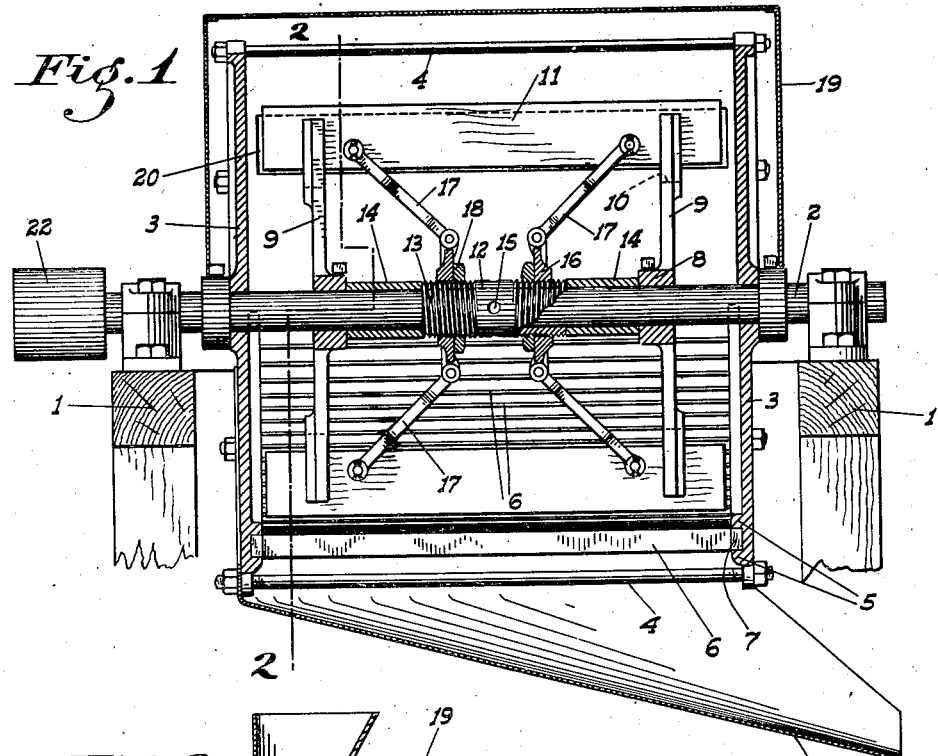
Figure 1 is a sectional elevation through the huller.

Referring now more particularly to the characters of reference on the drawings, the numeral 1 denotes a suitable supporting frame work, on which is mounted a horizontal shaft 2. Mounted on the shaft but immovable relative thereto, being supported by the frame, are a pair of spaced disks 3 adapted to be connected together by long bolts 4.

The lower halves of these disks are provided with concentric inwardly projecting flanges 5 adjacent the periphery of the disks, between which flanges and extending between the disks are narrow bars 6, positioned on edge radially, being spaced a suitable distance apart and held in such relation by spacer blocks 7 seated in the grooves formed by the flanges.

Secured on the shaft 2, between the disks 3, are a pair of spiders 8 having preferably eight rigid arms 9 radiating therefrom.

Figure 2:
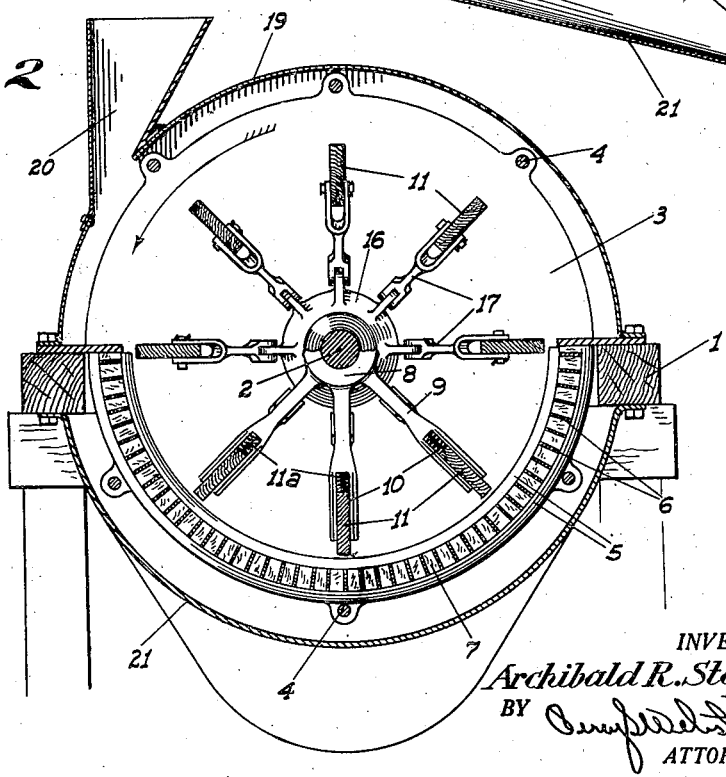
Fig. 2 is a cross section taken on a line 2—2 of Fig. 1.

The outer ends of these arms are forked in a plane lengthwise of the shaft, as shown at 10 in Fig. 2. Between the forks of each corresponding pair of arms is slidably positioned a beater board 11 extending between the spiders and projecting therebeyond to a point adjacent the disks 3, the outer edges of the boards being normally about an inch from the bars 6. Small coil springs 11$^a$ are preferably positioned in the forks and bear against the inner edge of the boards, keeping the same in outward tension.

Turnable on the shaft centrally between the spiders is a sleeve 12, being externally threaded at each end as at 13, one of such threads being cut right hand, and the other left hand. The central position of this sleeve is maintained by means of spacer sleeves 14 on the shaft between said sleeve and the spiders. Holes 15 are provided in the sleeve 12 so that a spanner may be used to turn the same. On each of the threaded portions of the sleeve 11 is a small disk 16, on which are pivoted eight arms 17, each one of which extends at an angle in the direction of the adjacent spider to the corresponding beater board 11, to which it is pivoted. Lock nuts 18 on the sleeve 12 bear against each disk to hold the same against undesired movement.

By this means it will be evident that on turning the sleeve 12, the arms 17 will be straightened out, or the angle increased, thus forcing out, or drawing in, all the boards 11 simultaneously, and so insuring that the outer edges of all of them will be the same distance from the center.

A sheet metal hood 19 extends between and over the disk 3 and incloses the space above the shaft 2. A hopper 20 is mounted on said hood or cover, and opens into the side of the same lengthwise thereof, this opening being positioned to throw the almonds passing therethrough directly into the path of the boards 11 on their downward sweep past the opening.

A discharge chute 21 surrounds the bars 7 therebelow and suitably spaced therefrom, being so angled that the almonds will readily slide thereon away from the bars.

Thus by reason of the adjustable beaters, I may maintain the same R. P. M. of the beaters for all varieties and sizes of almonds and instead of changing the speed when hulling different sized almonds, I merely adjust the beaters to suit.

Also with my huller, I am enabled to hull a great quantity of almonds in a given time, since as soon as an almond is hulled it immediately drops between the bars onto the discharge chute, instead of being continuously acted on by the revolving mechanism and having to work its way the whole length of the huller from the hopper to the discharge, thus effecting a considerable saving of power, and eliminating the chance of the almonds being cracked and abraded by constant frictional contact with each other.

The shaft 2 may of course be driven by any desired means, such as a belt drive over a pulley 22 on the shaft, leading to any suitable source of power.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:—

An almond huller comprising a cylindrical drum, a central shaft extending therethrough, armed spiders at each end of the shaft, radial slots in said arms, beater boards slidably mounted in the slots, and extending between corresponding arms, flexibly connected links holding the boards to prevent movement thereof in a plane parallel to the shaft, and springs in the slots under the boards, whereby the boards may have a flexible and opposed tilting movement from end to end relative to the plane of the length of the drum.

In testimony whereof I affix my signature in presence of a witness.

ARCHIBALD R. STEPHEN.

Witness:
BERNARD PRIVAT.